United States Patent [19]

Collombin

[11] 4,354,813
[45] Oct. 19, 1982

[54] PLANT FOR PRODUCING CONTAINERS BY DRAWING-BLOWING OF PREFORMS IN PLASTIC MATERIAL

[75] Inventor: André-Marcel Collombin, Geneva, Switzerland

[73] Assignee: Motosacoche S.A., Geneva, Switzerland

[21] Appl. No.: 192,232

[22] Filed: Sep. 30, 1980

[30] Foreign Application Priority Data

Oct. 9, 1979 [CH] Switzerland .................. 9069/79

[51] Int. Cl.³ ............................................. B29C 17/07
[52] U.S. Cl. ................................. 425/182; 264/535;
425/185; 425/186; 425/526; 425/534
[58] Field of Search ................. 425/526, 529, 534;
264/535; 198/472, 580

[56] References Cited

U.S. PATENT DOCUMENTS

| | | |
|---|---|---|
| 3,339,230 | 9/1967 | Farrell . |
| 3,809,208 | 5/1974 | Shields .................. 198/472 X |
| 4,147,250 | 4/1979 | Schulz ...................... 198/472 |

Primary Examiner—Jan H. Silbaugh
Attorney, Agent, or Firm—Young & Thompson

[57] ABSTRACT

A plant for producing articles by drawing-blowing of preforms in plastic material comprising a transport device for the preforms comprising independent supports (2,3) each receiving a preform and sliding in guides (1) forming a polygonal shape under the action of corner jacks (22, 23). The length of the path can be modified by adding portions of sliding rails (1) and the distance between centers of two adjacent preforms can be modified along the whole path.

6 Claims, 5 Drawing Figures

PLANT FOR PRODUCING CONTAINERS BY DRAWING-BLOWING OF PREFORMS IN PLASTIC MATERIAL

The known machines or plants for drawing-blowing a preform in plastic material are all designed in such a manner to allow the driving of such preforms along a path along which are situated working stations such as heating and conditioning ovens for the preform a drawing-blowing station and an ejection station for the finished article. The known machines comprise a fixed determined path, which is prejudicial to the adaptability of the machine, especially the heating time of the preforms, mainly depending on the plastic material which is used. This leads practically to the necessity of having specific machines for the treatment of various plastic materials, this representing an important investment for the user.

The object of the present invention is a plant for producing containers by drawing-blowing comprising a driving device for preforms along a path along which are situated means for conditioning and heating, a drawing-blowing station and an extraction station, tending to obviate the above mentioned drawbacks, and which is characterized by the fact that the driving device for the preforms comprises a plurality of independent supports disposed side by side and sliding in a guide extending along such path, by the fact that said guide defines in a plan view a path comprising several rectilinear parts forming angles with each other, and by the fact that the step by step advance of the supports along the guide is controlled by pushing members disposed in each angle of said guide.

The annexed drawings show schematically and by way of example an embodiment of the plant according to the invention.

The illustrated plant for producing containers in plastic material by drawing-blowing comprises, distributed along the path at least a reception station A for the preforms, a conditioning and heating device B for said preforms so as to bring them to their drawing-blowing temperature, a drawing-blowing station C and an extraction station for the finished articles D.

The plant comprises further a transport device for the preforms along said path. The transport device comprises guides or slide rails 1 defining the path forming a rectangle in a view from above. On both sides of the rectangular path the slide rails are wide whereas on both other sides, that is the small sides of the path, the slide rails are more narrow.

In a general manner the path presents in a view from above several rectilinear portions forming angles with each other. This path may be closed on itself and present a polygonal shape, or can be open.

Figure 1:
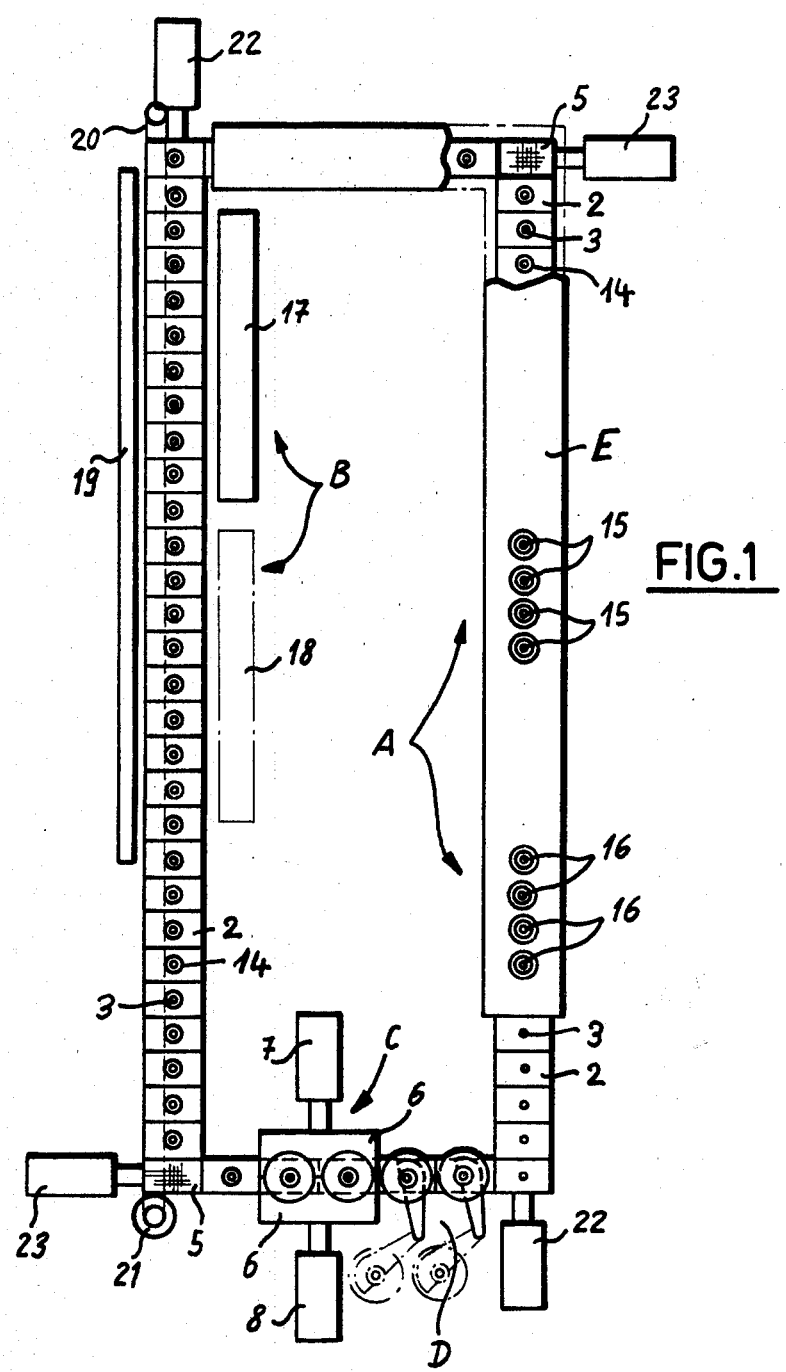
FIG. 1 is a schematic view from above of the plant.
Figure 2:
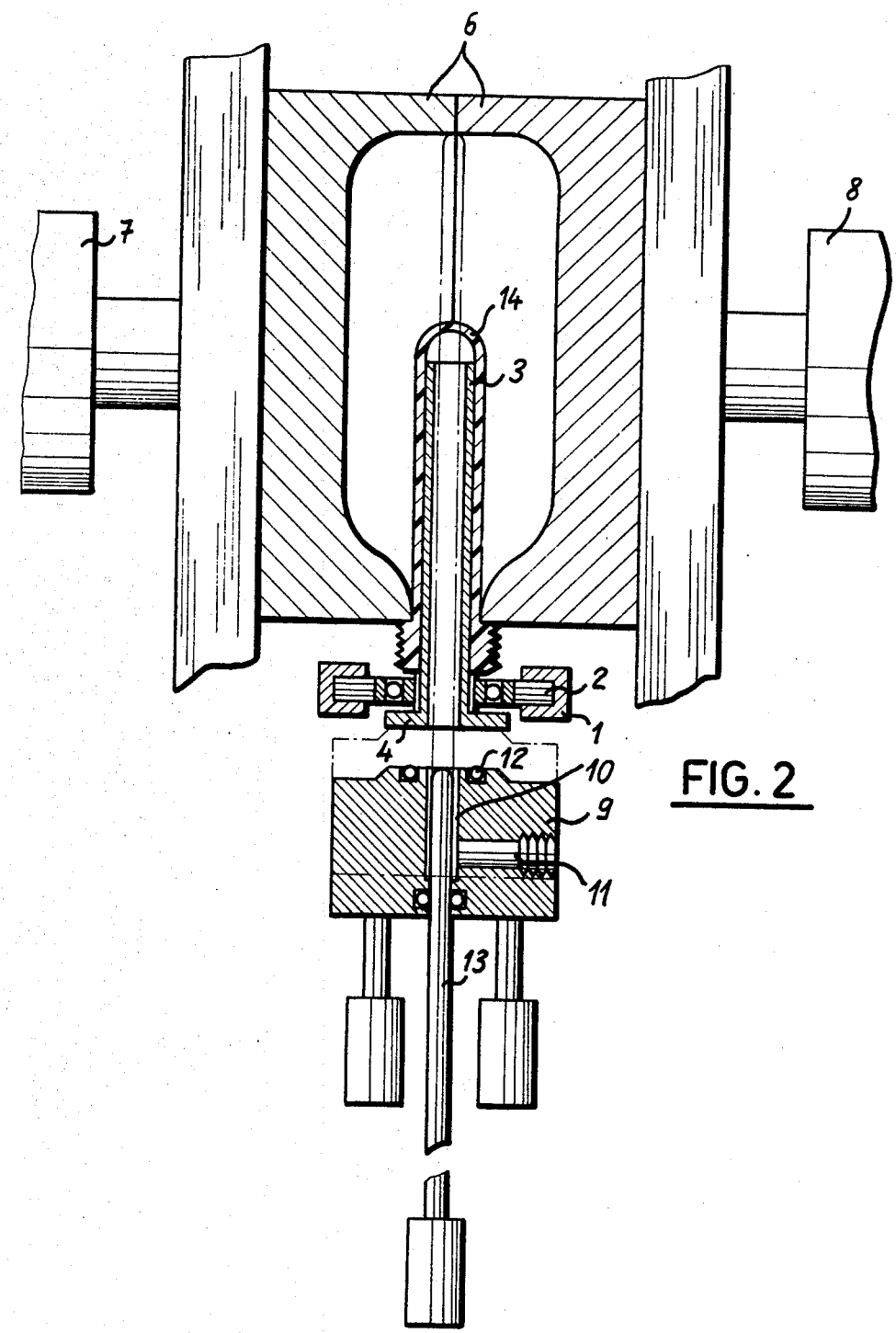
FIG. 2 is a cross-section of the drawing-blowing station.
Figure 3:
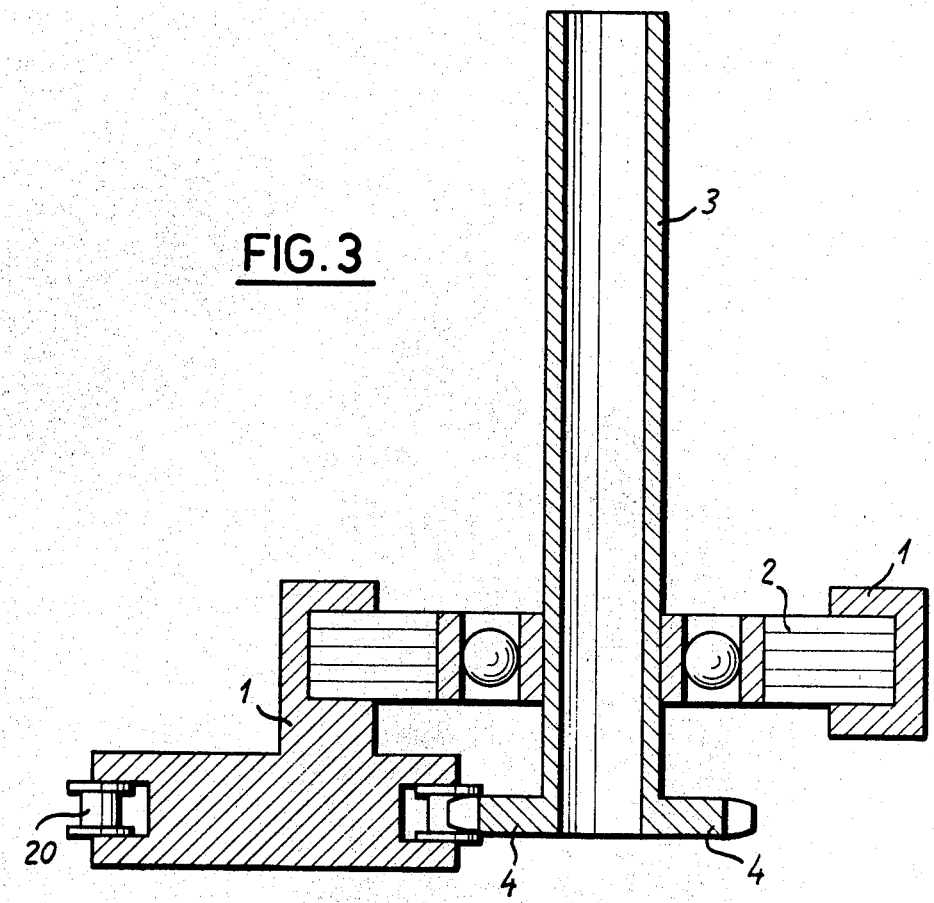
FIG. 3 shows in cross-section a detail of the driving of the preforms.
Figure 4:
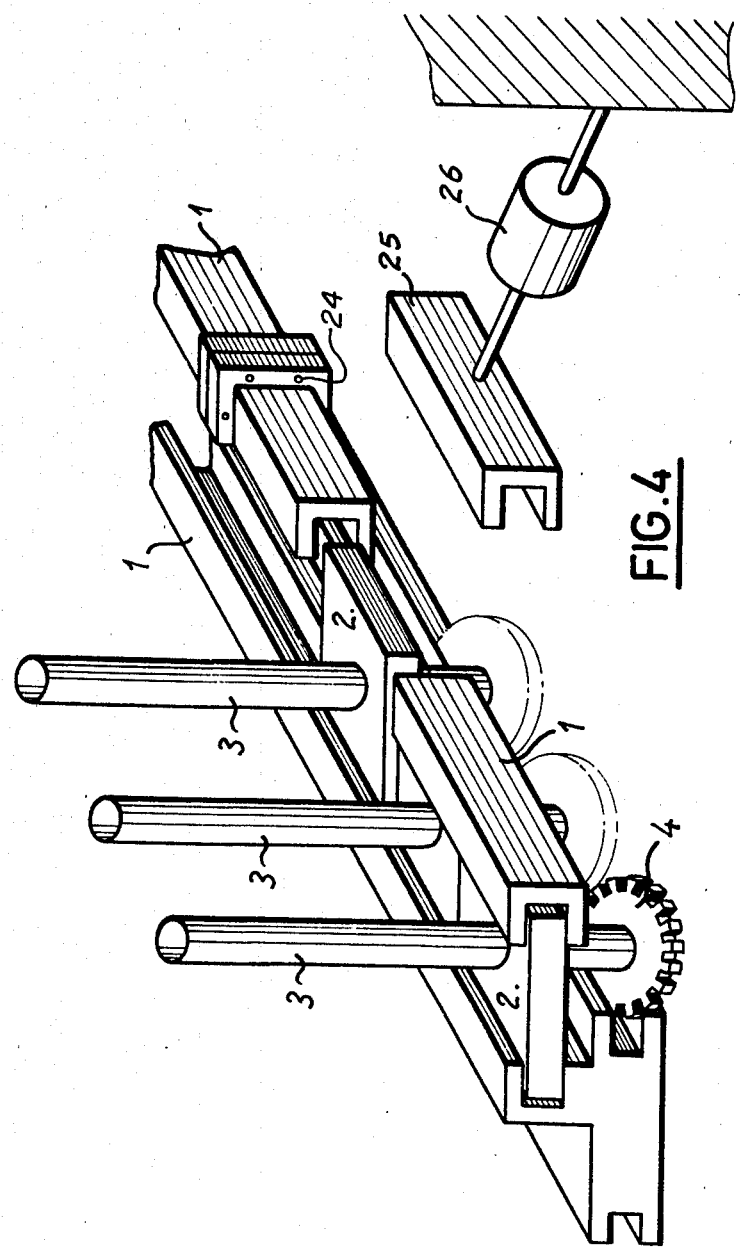
FIG. 4 shows in a perspective view some details of the driving device for the preforms.
Figure 5:
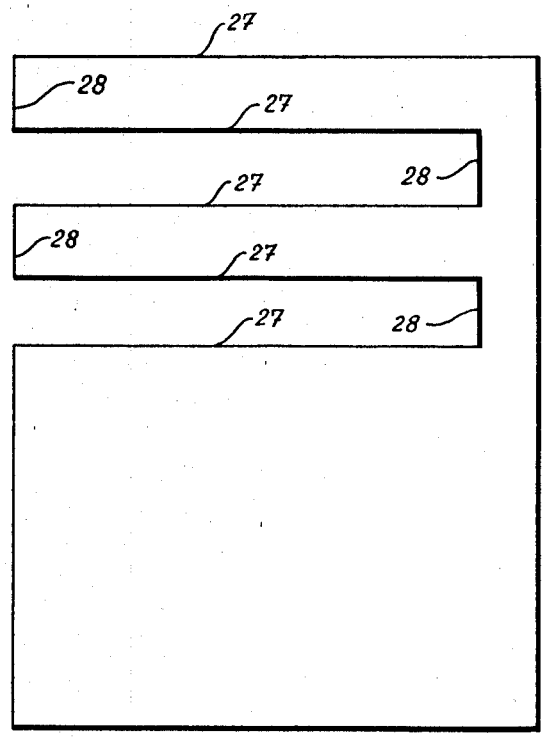
FIG. 5 shows a particular form of the path used in an embodiment.

According to the embodiment shown in FIG. 5, the path may also present, so as to increase its length and therefore the stocking capacity of the preforms, several parallel rectilinear parts 27 disposed side by side and connected at their opposed ends by short portions 28 of slide rail.

More particularly the path is formed of rectilinear parts, two adjacent parts forming a right angle between them.

Separate supports are disposed side by side in these slide rails and comprise a plate 2 guided in the slide rail and freely sliding therein. These plates 2 are provided with a receiving-supporting pipe 3, designed to receive a preform, and which is rotatably mounted on said plate with its lower end connected to a toothed wheel 4. The plates 2 are rectangular and their long side corresponds to the width of the long sliding rail, extending along the long sides of the path, whereas the short sides of the plates 2 correspond to the width of the narrow sliding rails forming the short sides of the path.

The supports 2 entirely occupy the slide rails 1 with the exception of two portions, of the same size as each support, which are disposed in two opposed corners 5 of the path.

Thanks to this arrangement, one can see that the distance between the axes of two receiving pipes 3 is smaller on the long sides of the path 1 than on the short sides thereof. The maximum distance between the axes of two adjacent receiving pipes 3, that is disposed on the short sides of the sliding rail 1, corresponds to the distance between centers of the two cavities of the mould or matrix 6 of the drawing-blowing station.

Thanks to this arrangement, it is possible to have a maximum number of preforms conveyed along the path, these preforms being near each other on the long sides of the path. The drawing-blowing station C is therefore disposed on one of the small sides of the path and comprises a mould or matrix 6 comprising two parts, the translation thereof being controlled by jacks 7, 8.

The mould 6 in two parts is disposed above the slide rails 1 and comes into service position around a preform carried by the receiving pipe 3 of a plate 2 situated perpendicularly to the drawing-blowing station. A vertically movable counter-piece 9 is disposed under the plate 2 and is alined on the pipe 3 in blowing position, and is designed to come into contact with the lower face of the toothed wheel 4. Consequently the inside of the receiving pipe 3 is brought into registry with a boring 10 connected through a passage 11 to a compressed air source. A joint 12 ensures the tightness between the counter-piece 9 and the receiving pipe 3.

A drawing bar or rod 13, coaxial with the receiving pipe in blowing position, may be moved vertically under the action of a jack for its introduction into the receiving pipe 3 and thereby to draw the preform 14. After having being drawn by said bar 13, the preform is inflated by blowing until it reaches its predetermined shape against the wall of the mould 6, the air under pressure being delivered inside the preform between the bar 13 and the pipe 3.

At least a part of the path followed by the preforms is surrounded by a heat-insulated enclosure E so as to avoid the loss of heat of the warm preforms coming from a preforming machine. These warm preforms, that is which are at a temperature higher than the room temperature, are delivered through holes 15 provided in this enclosure end each placed on a pipe 3.

A second series of holes 16 is provided in said enclosure so as to introduce cold preforms for example from a stock.

The heat-insulated enclosure E may comprise a series of introduction holes extending along a whole section thereof. A station for the distribution of preforms could be moved along this portion of the enclosure and cooperate with determined holes depending on the temperature of the preforms.

During their conveyance along the path defined by the slide rails 1, the preforms pass through a conditioning device comprising an oven 17 bringing said preforms to their blowing temperature. A second oven 18 is provided and is only used when the plant is supplied with cold preforms so as to provide additional heating. A reflecting member 19 is further provided for avoiding a loss of heat.

In order to obtain a uniform heating of the preforms about their entire periphery, they are driven in rotation about their axes during their transport along the long side of the path where the ovens 17, 18 are disposed. For this purpose a chain 20 is provided which is driven by a motor 21. This chain is engaged with the toothed wheels 4 of the supports 2 when these supports are moving along the large side of the path comprising the ovens. A guide for this chain is provided on the slide rail 1 on this side of the path.

The driving of the supports 2, 3 along the sliding rails is carried out by means of pushing members actuated by jacks and disposed in prolongation of the rectilinear portions of the path. The jacks 22 are actuated and the supports 2, 3 disposed on the long side of the path move one step, the empty places 5 being then filled up. Then the jacks 23 are actuated and the supports disposed along the short sides of the path are moved one step.

One can see that with this driving system an automatic change of sense of the support in the slide rails is obtained, and the supports are moving transversally along the long sides of the path and longitudinally along the short sides of said path. This feature allows to easily obtain the modification of the distance separating two preforms between the large and the small sides of the path merely by the sizes, lengths and widths, of the plates 2 of the support.

It is thus very important to be able to modify at discretion, for example depending on the plastic material used, the length of the path, in order to vary the heating time for example. With this plant, such a modification is easy to obtain, since it suffices to lengthen the long sides of the path by adding a portion of slide rails. Therefore, the slide rails are designed in section to be able to be connected the ones to the others for example by means of bolts 24.

In another embodiment, the width of the slide rails along the long sizes of the path can be equal to the width of the support, the length of said slide rails along the short sides of the path being thus equal to the length of the supports. It is important to obtain a modification of the distance between the axes of the supporting pipes between two adjacent portions of the sliding rail forming the path.

The sliding rails may comprise a removable part 25 which can be put in place or removed manually or by means of a jack 26. Thanks to this arrangement, it is possible during operation to remove a support and its preform and to replace it by another support. This is important either to eliminate a defective preform or for checking operations carried out on the preforms.

The main advantages of the plant according to the present invention are the following:

1. The ability to modify the distance between the axes of two preforms during their transport along the path.
2. The ability to remove a preform and its support during operation.
3. The ability to modify the length of the path of the preforms.
4. The ability, according to the shape of the path, to have a great number of supports carried along the path, this allowing to get more time for the heating, the reheating or the conditioning in temperature of the preforms. This is particularly important for the materials which are difficult to thermoform. In this case the conditioning time is not bound to the cadence of the machine.

Therefore this plant for producing articles in plastic material by drawing-blowing has a very important adaptivness and is compact, of little encumbrance, and is easy to use.

What is claimed is:

1. In a plant for producing containers by drawing-blowing of preforms in plastic material, comprising a conveying device for preforms along a path along whih are disposed conditioning and heating means, a drawing-blowing station and an extraction station, the conveying device for the preforms comprising a plurality of independent supports disposed side by side and sliding in a guide extending along said path, which is formed of a plurality of rectilinear slide rails forming right angles with each other, and in which the feeding of the supports along the guide is controlled by pushing members disposed in each angle of the guide; the improvement in which each support is elongated rectangular and carries only one preform; the guide comprising wide sliding rails extending in one direction and having a width corresponding to the length of the support, and narrow sliding rails extending perpendicularly to the wide sliding rails and having a width corresponding to the width of the supports; the supports moving longitudinally along the narrow sliding rails and transversely along the wide sliding rails so that the distance between the preforms carried by the supports is less along the wide sliding rails than along the narrow sliding rails, said path having two long sides along which said wide rails extend, interconnected at their ends by at least one short side along which said narrow rails extend, said drawing-blowing station being disposed along said short side, whereby the spacing between the preforms is augmented in the drawing-blowing station so as to facilitate the performance of a drawing-blowing operation thereon.

2. Plant according to claim 1, in which each support comprises a single upstanding receiving-supporting pipe for receiving a single preform thereon.

3. Plant according to claim 2, and means for rotating each said pipe along at least a portion of said path.

4. Plant according to claim 3, said rotating means comprising a toothed wheel on the lower end of said pipe, and a motor-driven chain drivingly engaging said toothed wheel.

5. Plant according to claim 1, said guide being in a plurality of sections, and means intermediate the length of at least two opposite sides of the guide for releaseably interconnecting said sections thereby to permit altering the length of the path by adding or removing at least one said section from each of said at least two opposite sides of the guide.

6. Plant according to claim 1, and means for advancing said supports along said path stepwise.

* * * * *